United States Patent
Qi

(10) Patent No.: US 12,098,932 B2
(45) Date of Patent: Sep. 24, 2024

(54) EDGE ENHANCED INCREMENTAL LEARNING FOR AUTONOMOUS DRIVING VEHICLES

(71) Applicant: GM Global Technology Operations LLC, Detroit, MI (US)

(72) Inventor: Wenyuan Qi, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 196 days.

(21) Appl. No.: 17/812,497

(22) Filed: Jul. 14, 2022

(65) Prior Publication Data
US 2024/0011791 A1 Jan. 11, 2024

(30) Foreign Application Priority Data
Jul. 6, 2022 (CN) .......................... 202210788791.3

(51) Int. Cl.
G01C 21/00 (2006.01)
G01C 21/34 (2006.01)
H04W 4/44 (2018.01)

(52) U.S. Cl.
CPC ..... *G01C 21/3841* (2020.08); *G01C 21/3415* (2013.01); *H04W 4/44* (2018.02)

(58) Field of Classification Search
CPC .. G01C 21/3841; G01C 21/3415; H04W 4/44
See application file for complete search history.

(56) References Cited

U.S. PATENT DOCUMENTS

| | | | |
|---|---|---|---|
| 10,466,717 B1 * | 11/2019 | Su | H04W 4/44 |
| 11,657,604 B2 * | 5/2023 | Huberman | G05D 1/0219 |
| | | | 382/157 |
| 11,821,742 B2 * | 11/2023 | Brown | G01C 21/3476 |
| 11,885,633 B1 * | 1/2024 | Bustos | G01C 21/3676 |
| 12,038,286 B2 * | 7/2024 | Vukich | G06Q 20/4015 |
| 2018/0107215 A1 * | 4/2018 | Djuric | B60W 60/0016 |
| 2018/0373980 A1 * | 12/2018 | Huval | G06F 18/41 |
| 2019/0277643 A1 * | 9/2019 | Szubbocsev | G05D 1/0212 |
| 2019/0293437 A1 * | 9/2019 | Szubbocsev | G06F 16/29 |
| 2020/0023846 A1 * | 1/2020 | Husain | H04W 4/44 |
| 2020/0174472 A1 * | 6/2020 | Zhang | G06N 3/084 |
| 2020/0293054 A1 * | 9/2020 | George | G05D 1/0221 |
| 2021/0248460 A1 * | 8/2021 | Sykora | G06N 3/08 |
| 2021/0383209 A1 * | 12/2021 | Brahma | G06V 20/56 |
| 2022/0092321 A1 * | 3/2022 | Keiser | G06V 10/82 |
| 2022/0111859 A1 * | 4/2022 | Lu | G01C 21/3453 |
| 2022/0172062 A1 * | 6/2022 | Singh | B60W 50/0097 |
| 2023/0040006 A1 * | 2/2023 | Weiss | G06N 20/00 |
| 2023/0168095 A1 * | 6/2023 | Lee | G01C 21/3415 |
| 2024/0199015 A1 * | 6/2024 | Creighton | B60W 40/105 |

* cited by examiner

*Primary Examiner* — Abdalla A Khaled
(74) *Attorney, Agent, or Firm* — Vivacqua Crane, PLLC

(57) ABSTRACT

A system comprises a computer including a processor and a memory. The memory includes instructions such that the processor is programmed to: determine, via a trained neural network model, a route for a vehicle to traverse based on vehicle sensor data, and update the trained neural network model based on data received from at least one of an edge computing device or an infrastructure (V2I) device.

14 Claims, 5 Drawing Sheets

EDGE ENHANCED INCREMENTAL LEARNING FOR AUTONOMOUS DRIVING VEHICLES

INTRODUCTION

The present disclosure relates to incrementally updating a trained neural network at an ego-vehicle based on data received from edge computing devices, infrastructure devices, and/or other vehicles.

Cloud computing and edge computing can be used to support various V2X use cases, such as vehicle to vehicle (V2V), vehicle to infrastructure (V2I), vehicle to pedestrian (V2P), etc. For example, edge computing devices may employ sensors, such as cameras and the like, that monitor environments traversed by vehicles. These edge computing devices can broadcast data representing detected objects and the like to vehicles proximate to the edge computing device.

SUMMARY

A system comprises a computer including a processor and a memory. The memory includes instructions such that the processor is programmed to: determine, via a trained neural network model, a route for a vehicle to traverse based on vehicle sensor data, and update the trained neural network model based on data received from at least one of an edge computing device or an infrastructure (V2I) device.

In other features, the processor is further programmed to update the trained neural network model based on data received from at least one other vehicle.

In other features, the processor is further programmed to receive the trained neural network model via an over-the-air (OTA) update.

In other features, the processor is further programmed to determine another route via the updated trained neural network model.

In other features, the processor is further programmed to cause the vehicle to traverse the route.

In other features, the infrastructure device comprises a roadside device.

In other features, the edge computing device comprises an edge server.

In other features, the processor is further programmed to store a data structure representing a change in weights between the trained neural network model and the updated trained neural network model.

In other features, the processor is further programmed to upload the data structure to a specification platform.

In other features, the processor is further programmed to receive a second trained neural network model from the specification platform, wherein the second trained neural model includes updated weights based on data stored within the data structure.

A method includes determining, via a trained neural network model, a route for a vehicle to traverse based on vehicle sensor data, and updating the trained neural network model based on data received from at least one of an edge computing device or an infrastructure (V2I) device.

In other features, the method further includes updating the trained neural network model based on data received from at least one other vehicle.

In other features, the method further includes receiving the trained neural network model via an over-the-air (OTA) update.

In other features, the method further includes determining another route via the updated trained neural network model.

In other features, the method further includes causing the vehicle to traverse the route.

In other features, the infrastructure device comprises a roadside device.

In other features, the edge computing device comprises an edge server.

In other features, the method further includes storing a data structure representing a change in weights between the trained neural network model and the updated trained neural network model.

In other features, the method further includes uploading the data structure to a specification platform.

In other features, the method further including receiving a second trained neural network model from the specification platform, wherein the second trained neural model includes updated weights based on data stored within the data structure.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Some vehicles, such as autonomous vehicles, employ cloud computing and edge computing services to communicate with other vehicles, infrastructure, and pedestrians. Cloud computing and edge computing can support vehicle-to-vehicle (V2V), vehicle-to-infrastructure (V2I), and vehicle-to-pedestrian (V2P), collectively known as V2X, use cases, enhancing vehicle and pedestrian safety. Cloud computing and edge computing allow vehicles to communicate with other vehicles, infrastructure, and/or pedestrians, using wireless communications technologies such as, but not limited to, cellular, Bluetooth®, IEEE 802.11, dedicated short range communications (DSRC), ultra-wideband (UWB), and/or wide area networks (WAN).

Within Intelligent Transportation Systems (ITS), roadside devices may be located along one or more roadways to capture vehicle-generated traffic data and provide information, such as traffic advisories, from the infrastructure, e.g., roadside device, to cloud and edge, and then to vehicles to inform the driver and/or vehicle of safety, mobility, and/or environment-related conditions. In some instances, roadside devices are positioned within signalized intersections to provide information to the vehicles traveling proximate to the signalized intersection.

Figure 1:
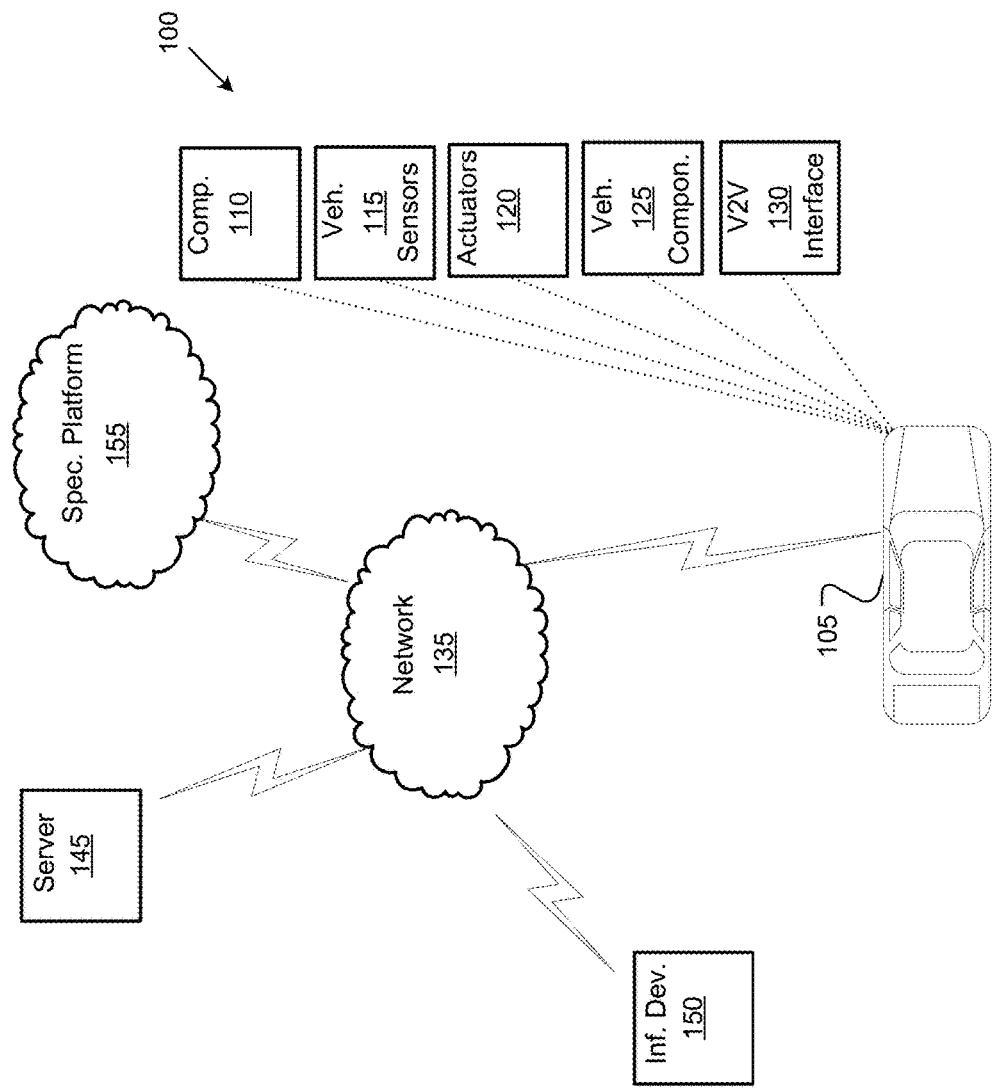
FIG. 1 is a block diagram of an example system including a vehicle.

FIG. 1 is a block diagram of an example vehicle system 100. The system 100 includes a vehicle 105, which can comprise a land vehicle such as a car, truck, etc., an aerial vehicle, and/or an aquatic vehicle. The vehicle 105 includes a computer 110, vehicle sensors 115, actuators 120 to actuate various vehicle components 125, and a vehicle communications module 130. Via a network 135, the communications module 130 allows the computer 110 to communicate with a server 145.

The computer 110 may operate a vehicle 105 in an autonomous, a semi-autonomous mode, or a non-autonomous (manual) mode. For purposes of this disclosure, an autonomous mode is defined as one in which each of vehicle 105 propulsion, braking, and steering are controlled by the computer 110; in a semi-autonomous mode the computer 110 controls one or two of vehicles 105 propulsion, braking, and steering; in a non-autonomous mode a human operator controls each of vehicle 105 propulsion, braking, and steering.

The computer 110 may include programming to operate one or more of vehicle 105 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via the vehicle 105 communications module 130 as described further below, more than one processor, e.g., included in electronic controller units (ECUs) or the like included in the vehicle 105 for monitoring and/or controlling various vehicle components 125, e.g., a powertrain controller, a brake controller, a steering controller, etc. Further, the computer 110 may communicate, via the vehicle 105 communications module 130, with a navigation system that uses the Global Position System (GPS). As an example, the computer 110 may request and receive location data of the vehicle 105. The location data may be in a known form, e.g., geo-coordinates (latitudinal and longitudinal coordinates).

The computer 110 is generally arranged for communications on the vehicle 105 communications module 130 and also with a vehicle 105 internal wired and/or wireless network, e.g., a bus or the like in the vehicle 105 such as a controller area network (CAN) or the like, and/or other wired and/or wireless mechanisms.

Via the vehicle 105 communications network, the computer 110 may transmit messages to various devices in the vehicle 105 and/or receive messages from the various devices, e.g., vehicle sensors 115, actuators 120, vehicle components 125, a human machine interface (HMI), etc. Alternatively or additionally, in cases where the computer 110 actually comprises a plurality of devices, the vehicle 105 communications network may be used for communications between devices represented as the computer 110 in this disclosure. Further, as mentioned below, various controllers and/or vehicle sensors 115 may provide data to the computer 110. The vehicle 105 communications network can include one or more gateway modules that provide interoperability between various networks and devices within the vehicle 105, such as protocol translators, impedance matchers, rate converters, and the like.

Vehicle sensors 115 may include a variety of devices such as are known to provide data to the computer 110. For example, the vehicle sensors 115 may include Light Detection and Ranging (lidar) sensor(s) 115, etc., disposed on a top of the vehicle 105, behind a vehicle 105 front windshield, around the vehicle 105, etc., that provide relative locations, sizes, and shapes of objects and/or conditions surrounding the vehicle 105. As another example, one or more radar sensors 115 fixed to vehicle 105 bumpers may provide data to provide and range velocity of objects (possibly including second vehicles 106), etc., relative to the location of the vehicle 105. The vehicle sensors 115 may further include camera sensor(s) 115, e.g., front view, side view, rear view, etc., providing images from a field of view inside and/or outside the vehicle 105.

The vehicle 105 actuators 120 are implemented via circuits, chips, motors, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

In addition, the computer 110 may be configured for communicating via a vehicle-to-vehicle communication module or interface 130 with devices outside of the vehicle 105, e.g., through a vehicle to vehicle (V2V) or vehicle-to-infrastructure (V2I) wireless communications to another vehicle, to (typically via the network 135) a remote server 145, such as an edge server. The module 130 could include one or more mechanisms by which the computer 110 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the module 130 include cellular, Bluetooth®, IEEE 802.11, dedicated short-range communications (DSRC), and/or wide area networks (WAN), including the Internet, providing data communication services.

The network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, Bluetooth Low Energy (BLE), IEEE 802.11, vehicle-to-vehicle (V2V) such as Dedicated Short-Range Communications (DSRC), etc.), local area networks (LAN)

and/or wide area networks (WAN), including the Internet, providing data communication services.

The system 100 also includes an infrastructure device 150, which can communicate with the server 145 and the vehicle 105 via the communication network 135. While only a single infrastructure device 150 is illustrated, it is understood that the system 100 can include multiple infrastructure devices 150 deployed throughout a traffic environment traversable by the vehicle 105. The infrastructure device 150 may comprise roadside devices, traffic lights, cameras attached to structures, or any other Vehicle-to-Infrastructure (V2I) devices.

The system 100 also includes a specification platform 155 that provide distributed learning functionality to the system 100. In an example implementation, the specification platform 155 communicates with the server 145, e.g., an edge computing device, via the communication network 135. Components and functionality of the specification platform are described in greater detail below.

Figure 2:
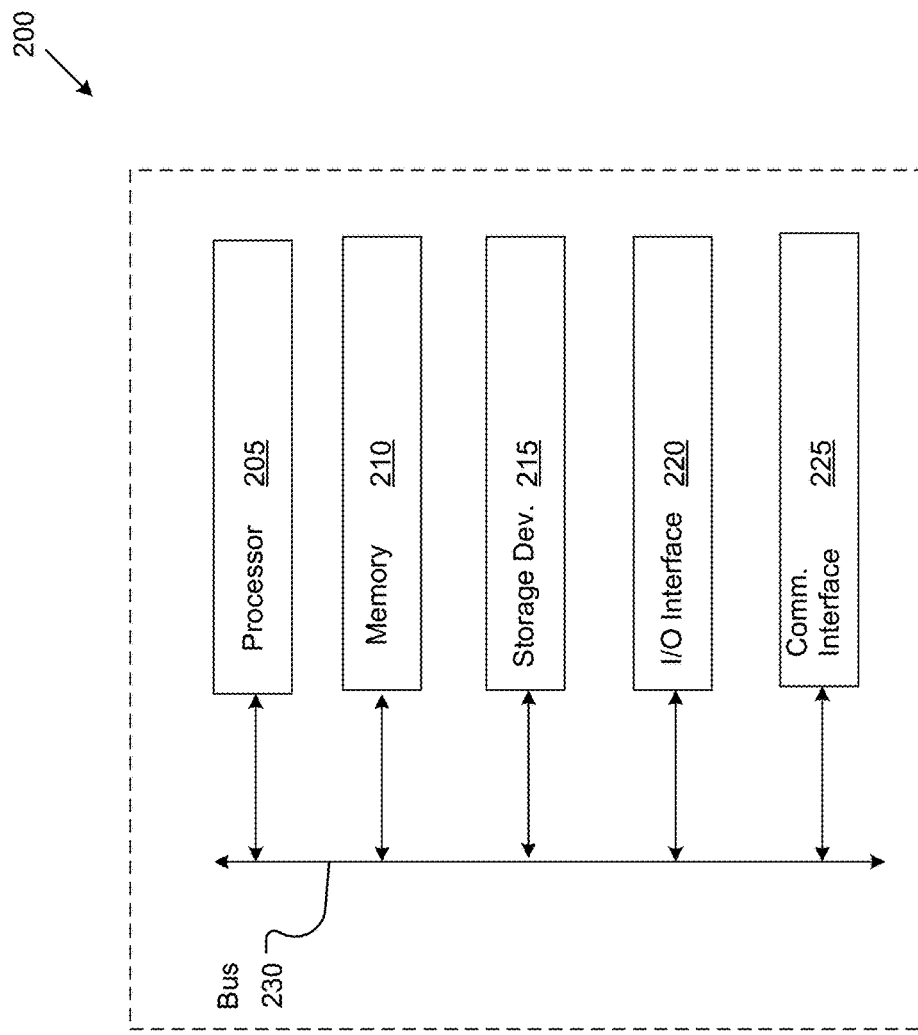
FIG. 2 is a block diagram of an example computing device.

FIG. 2 illustrates an example computing device 200 configured to perform one or more of the processes described herein. As shown, the computing device can comprise a processor 205, memory 210, a storage device 215, an I/O interface 220, and a communication interface 225. Furthermore, the computing device 200 can include an input device such as a touchscreen, mouse, keyboard, etc. In certain implementations, the computing device 200 can include fewer or more components than those shown in FIG. 2.

In particular implementations, processor(s) 205 includes hardware for executing instructions, such as those making up a computer program. As an example, and not by way of limitation, to execute instructions, processor(s) 205 may retrieve (or fetch) the instructions from an internal register, an internal cache, memory 210, or a storage device 215 and decode and execute them.

The computing device 200 includes memory 210, which is coupled to the processor(s) 205. The memory 210 may be used for storing data, metadata, and programs for execution by the processor(s). The memory 210 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 210 may be internal or distributed memory.

The computing device 200 includes a storage device 215 includes storage for storing data or instructions. As an example, and not by way of limitation, storage device 215 can comprise a non-transitory storage medium described above. The storage device 215 may include a hard disk drive (HDD), flash memory, a Universal Serial Bus (USB) drive or a combination of these or other storage devices.

The computing device 200 also includes one or more input or output ("I/O") devices/interfaces 220, which are provided to allow a user to provide input to (such as user strokes), receive output from, and otherwise transfer data to and from the computing device 200. These I/O devices/interfaces 220 may include a mouse, keypad or a keyboard, a touch screen, camera, optical scanner, network interface, modem, other known I/O devices or a combination of such I/O devices/interfaces 220. The touch screen may be activated with a writing device or a finger.

The I/O devices/interfaces 220 may include one or more devices for presenting output to a user, including, but not limited to, a graphics engine, a display (e.g., a display screen), one or more output drivers (e.g., display drivers), one or more audio speakers, and one or more audio drivers.

In certain implementations, devices/interfaces 220 is configured to provide graphical data to a display for presentation to a user. The graphical data may be representative of one or more graphical user interfaces and/or any other graphical content as may serve a particular implementation.

The computing device 200 can further include a communication interface 225. The communication interface 225 can include hardware, software, or both. The communication interface 225 can provide one or more interfaces for communication (such as, for example, packet-based communication) between the computing device and one or more other computing devices 200 or one or more networks. As an example, and not by way of limitation, communication interface 225 may include a network interface controller (NIC) or network adapter for communicating with an Ethernet or other wire-based network or a wireless NIC (WNIC) or wireless adapter for communicating with a wireless network, such as a WI-FI. The computing device 200 can further include a bus 230. The bus 230 can comprise hardware, software, or both that couples components of the computing device 200 to each other.

Figure 3:
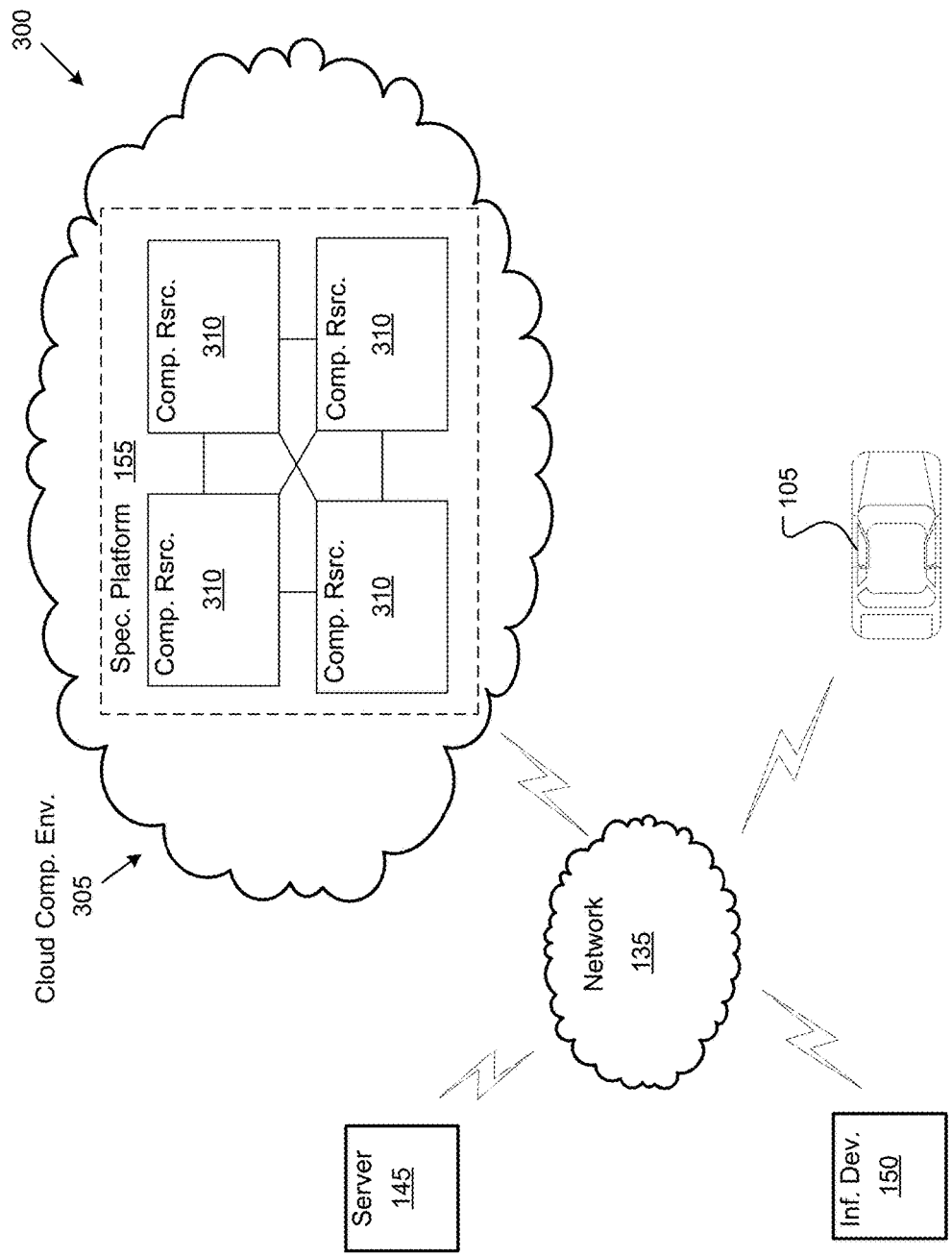
FIG. 3 is a block diagram of an example environment including an ego-vehicle, an edge computing device, an infrastructure device, and a specification platform.

FIG. 3 illustrates an example environment 300 that includes a vehicle 105 in communication with an edge computing device 145 and/or an infrastructure device 150. The edge computing device 145 and/or the infrastructure device 150 may further be in communication with a specification platform 155. As discussed below, the specification platform 155 can retrain one or more neural network models based on records uploaded to the specification platform 155 from the vehicle 105. The records can comprise data representing incremental changes to the neural network model during vehicle 105 operation.

Referring to the specification platform 155, the specification platform 155 may be designed to be modular such that certain software components may be swapped in or out depending on a particular need. As such, the specification platform 155 may be easily and/or quickly reconfigured for different uses. In some implementations, the specification platform 155 may receive information from and/or transmit information to one or more client edge servers 145 and/or one or more infrastructure devices 150.

In some implementations, as shown, the specification platform 155 may be hosted in a cloud computing environment 305, an on-premise computing environment, a hybrid (e.g., on-premise and cloud-based) computing environment, and/or the like. Notably, while implementations described herein describe the specification platform 155 as being hosted in a cloud computing environment, in some implementations, specification platform 155 may not be cloud-based (i.e., may be implemented outside of a cloud computing environment) or may be partially cloud-based.

The cloud computing environment 305 includes an environment that hosts the specification platform 155. Cloud computing environment 305 may provide computation, software, data access, storage, etc., services that do not require end-user knowledge of a physical location and configuration of system(s) and/or device(s) that hosts the specification platform 155. As shown, cloud computing environment may include a group of computing resources 310 (referred to collectively as "computing resources 124" and individually as "computing resource 310").

The computing resource 310 includes one or more personal computers, workstation computers, mainframe devices, or other types of computation and/or communication devices. In some implementations, the computing resource 310 may host the specification platform 155. The cloud resources may include compute instances executing in the computing resource 310, storage devices provided in the computing resource 310, data transfer devices provided by the computing resource 310, etc. In some implementations, the computing resource 310 may communicate with other computing resources 310 via wired connections, wireless connections, or a combination of wired and wireless connections.

Figure 4B:
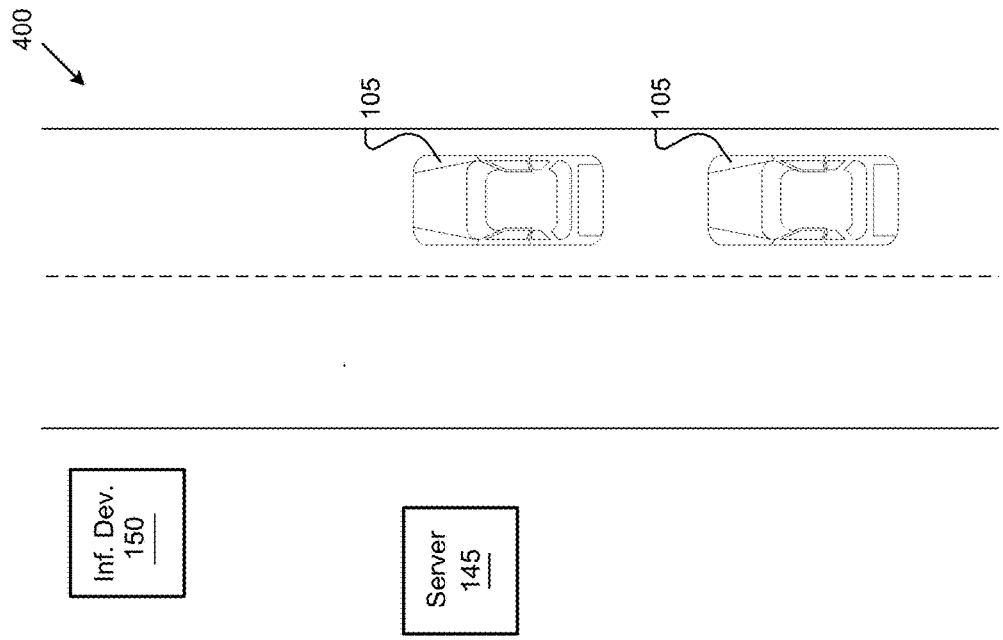
FIG. 4B is a block diagram of example environment including the ego-vehicle, another vehicle, an edge computing device, and an infrastructure device.
Figure 4A:
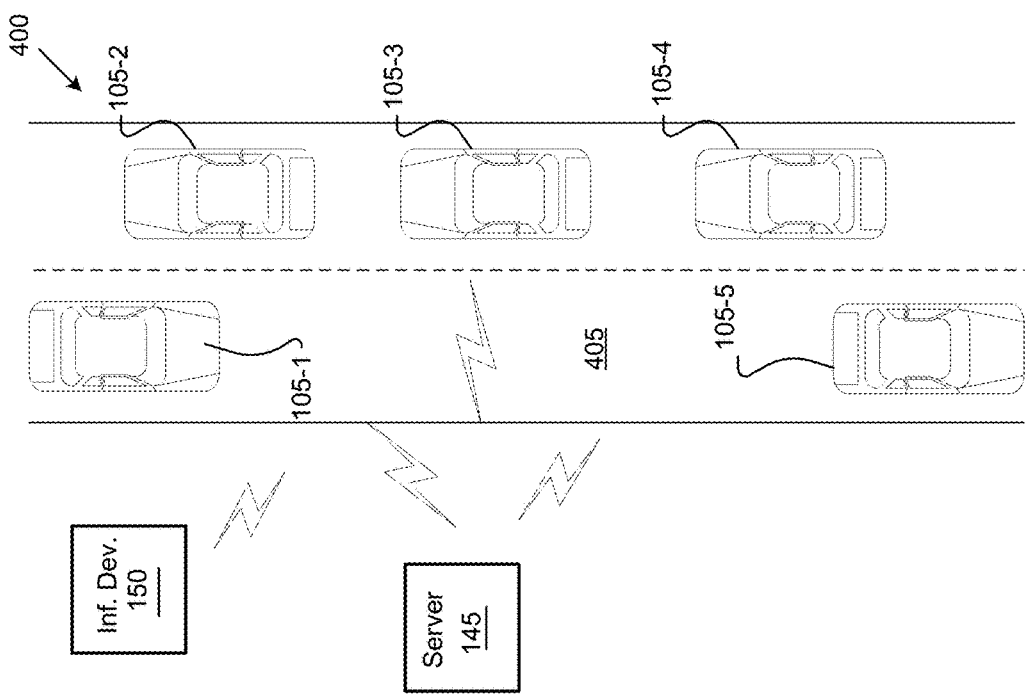
FIG. 4A is a block diagram of example environment including an ego-vehicle, other vehicles, an edge computing device, and an infrastructure device.

FIG. 4A illustrates an example environment 400 that includes multiple vehicles 105-1 through 105-5 traversing a roadway 405. The environment 400 also includes an edge computing device 145 and/or an infrastructure device 150 that broadcasts data indicative of the environment 400. For example, the edge computing device 145 and/or the infrastructure device 150 can broadcast data indicative of other vehicles 105-2 through 105-5 also traversing the roadway 405.

Within environment 400, the vehicle 105-1 comprises an ego-vehicle. Each vehicle 105-1 through 105-5 may comprise at least a semi-autonomous vehicle. In other words, each vehicle 105-1 through 105-5 can include one or more neural network models to assist the vehicles 105-1 through 105-5 in performing semi-autonomous vehicle actions. The neural network models used by a respective vehicle's 105-1 through 105-5 computer 110 to perform semi-autonomous vehicle actions. In an example implementation, the neural network models may provide at least perception functionality and/or route planning functionality based on sensor data.

Within the present context, the vehicle 105-1 (as well as vehicles 105-2 through 105-5) can initially receive neural network models via suitable over-the-air (OTA) services through a secure communication channel offline, i.e., vehicle manufacturer, during vehicle maintenance, etc. Referring to FIG. 4A, the vehicle 105-1 can use a neural network model to perceive a surrounding environment and plan a route based on the perceived environment.

The computer 110 of the vehicle 105-1 can also receive the data broadcast from the edge computing device 145 and/or the infrastructure device 150, and the neural network model running on the computer 110 can incorporate the data for planning. For example, the computer 110 can incorporate suitable data fusion techniques while executing the neural network model.

FIG. 4B illustrates the environment 400 in which the neural network model of the vehicle 105-1 only perceives the vehicle 105-2 based on sensor data generated by the vehicle 105-1 sensors 115. As such, as discussed below, the neural network model of the vehicle 105-1 may implement incremental learning based on data broadcast from the edge computing device 145 and/or the infrastructure device 150 as well as from sensor data transmitted by other vehicles 105-2 through 105-5.

Figure 5:
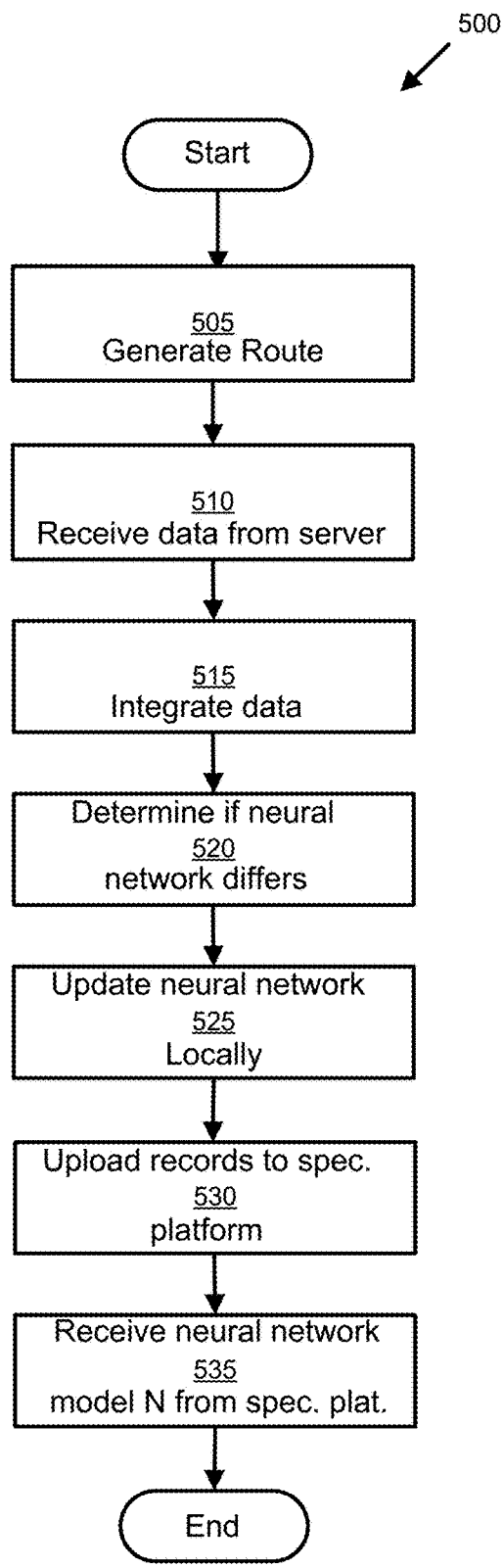
FIG. 5 is a flow diagram illustrating an example process for incrementally updating a trained neural network.

FIG. 5 illustrates an example process 500 for incrementally updating a trained neural network. Blocks of the process 500 can be executed by the computer 110 of the ego-vehicle, i.e., vehicle 105-1. Within process 500, the computer 110 received a trained neural network model via an over-the-air (OTA) update from the specification platform 155. At block 505, the trained neural network model generates a route to traverse based on sensor data received from the sensors 115.

At block 510, the computer 110 receives data from the edge computing device 145 and/or the infrastructure device 150. The data can include data representing perceived objects, such as vehicles and/or obstacles, detected by sensors associated with the edge computing device 145 and/or the infrastructure device 150. The data can further include proposed routes generated by neural network models local to the edge computing device 145 and/or the infrastructure device 150. In some implementations, the computer 110 can receive data transmitted from other vehicles 105-2 through 105-5 proximate to the ego-vehicle. This data can comprise perceived objects detected by the other vehicles 105-2 through 105-5. In some instances, the computer 110 integrates the data received at blocks 510, 515 for comparison purposes.

At block 520, the computer 110 determines whether the output, i.e., the planned route, from the neural network model differs from the data provided by other vehicles 105-2 through 105-5 and/or the edge computing device 145 and/or the infrastructure device 150. The computer 110 can determine whether the neural network model differs by comparing an accuracy of the neural network model's output using sensor data from the sensors 115 with respect to an accuracy of the neural network model's output using sensor data from the sensors 115 and the data received at blocks 510, 515.

If the difference in accuracy is greater than a predetermined accuracy amount, the computer 110 can update the neural network model locally at block 525. During the local update process, the computer 110 can use the data from blocks 510, 515 to update one or more weights of the neural network model locally. The weights may be updated via a suitable backpropagation technique, or the like. The computer 110 may also generate and store records, i.e., data structures, that traces the incremental neural network model updates.

At block 530, the computer 110 may upload the records to the specification platform 155. The specification platform 155 can retrain, or merge, the neural network model with data stored in the records according to $$N = M' \oplus \Sigma_i^n \Delta wi \qquad \text{Eqn. 1,}$$

where N represents an updated neural network model, M' represents a neural network model retained at the specification platform 155, $\oplus$ represents a weight update operator, $\Sigma$ represents a summation of the weight operation applied to the difference in weights between neural network models ranging from i to n. The weight differences can be maintained within the records that include the differences in weights for each incrementally updated neural network model. At block 535, the computer 110 can receive the neural network model N from the specification platform 155. The process 500 then ends.

It is understood that the vehicle 105-1 may travel within different traffic environments. For example, the vehicle 105-1 may travel between a first urban environment and second urban environment, and the vehicle 105-1 may include a neural network model corresponding to the first urban environment. In these instances, the traffic environments and/or traffic behaviors may differ substantially. However, the computer 110 may determine that a perception accuracy of the neural network model is greater than a predetermined perception accuracy while traversing the second urban environment. In these instances, the computer 110 may not update, or merge, neural network models associated with the second urban environment.

Conversely, the computer 110 may determine that the neural network model utilized for perception purposes may not be suitable within a particular environment. In these instances, the computer 110 may cause the vehicle 105 to convert from an autonomous mode of operation to a manual mode of operation when a difference in neural network model accuracy is greater than a non-accurate parameter. The non-accurate parameter can comprise a predetermined value set by empirical analysis based on various environments encountered by autonomous vehicles.

The description of the present disclosure is merely exemplary in nature and variations that do not depart from the gist of the present disclosure are intended to be within the scope of the present disclosure. Such variations are not to be regarded as a departure from the spirit and scope of the present disclosure.

In general, the computing systems and/or devices described may employ any of a number of computer operating systems, including, but by no means limited to, versions and/or varieties of the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer readable medium (also referred to as a processor readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain implementations, and should in no way be construed so as to limit the claims.

Accordingly, it is to be understood that the above description is intended to be illustrative and not restrictive. Many implementations and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future implementations. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system for edge enhanced incremental learning for autonomous driving vehicles, the system comprising:
a computer including a processor and a memory, the memory including instructions such that the processor is programmed to:
determine, via a trained neural network model, a route for a vehicle to traverse based on vehicle sensor data; and
update the trained neural network model based on data received from at least one of an edge computing device or an infrastructure (V2I) device,
wherein the edge computing device comprises an edge server,
wherein the processor is further programmed to store a data structure representing a change in weights between the trained neural network model and the updated trained neural network model, wherein the processor is further programmed to upload the data structure to a specification platform, wherein the specification platform retrains the trained neural network model with stored data according to:

$N=M'\oplus\Sigma_i^n \Delta wi$, where N represents an updated neural network model, M' represents a neural network model retained at the specification platform, $\oplus$ represents a weight update operator, $\Sigma$ represents a summation of a weight operation applied to a difference in weights between neural network models ranging from i to n, wherein the difference in weights is maintained within records that include the differences in weights for each incrementally updated neural network model; and
selectively performing autonomous driving functions including: braking, acceleration, and steering of the vehicle via actuators implemented by control signals from the computer, unless a difference in neural network model accuracy is greater than a non-accurate parameter set by empirical analysis based on various environments encountered by autonomous vehicles, wherein when the difference in neural network model accuracy is greater than the non-accurate parameter, the system causes the vehicle to convert from an autonomous mode of operation to a manual mode of operation.

2. The system of claim 1, wherein the processor is further programmed to update the trained neural network model based on data received from at least one other vehicle.

3. The system of claim 1, wherein the processor is further programmed to receive the trained neural network model via an over-the-air (OTA) update.

4. The system of claim 1, wherein the processor is further programmed to determine another route via the updated trained neural network model.

5. The system of claim 1, wherein the processor is further programmed to cause the vehicle to traverse the route.

6. The system of claim 1, wherein the infrastructure device comprises a roadside device.

7. The system of claim 1, wherein the processor is further programmed to receive a second trained neural network model from the specification platform, wherein the second trained neural model includes updated weights based on data stored within the data structure.

8. A method for edge enhanced incremental learning for autonomous driving vehicles, the method comprising:
determining, via a trained neural network model, a route for a vehicle to traverse based on vehicle sensor data; and
updating the trained neural network model based on data received from at least one of an edge computing device or an infrastructure (V2I) device, wherein the edge computing device comprises an edge server;
storing, by a processor, a data structure representing a change in weights between the trained neural network model and the updated trained neural network model;
uploading, by the processor, the data structure to a specification platform;
retraining, by the specification platform, the trained neural network model with stored data according to:

$N=M'\oplus\Sigma_i^n \Delta wi$, where N represents an updated neural network model, M' represents a neural network model retained at the specification platform, $\oplus$ represents a weight update operator, $\Sigma$ represents a summation of a weight operation applied to a difference in weights between neural network models ranging from i to n, wherein the difference in weights is maintained within records that include the differences in weights for each incrementally updated neural network model; and
selectively performing autonomous driving functions including: braking, acceleration, and steering of the vehicle via actuators implemented by control signals from the computer, unless a difference in neural network model accuracy is greater than a non-accurate parameter set by empirical analysis based on various environments encountered by autonomous vehicles; and
when the difference in neural network model accuracy is greater than the non-accurate parameter, causing the vehicle to convert from an autonomous mode of operation to a manual mode of operation.

9. The method of claim 8, the method further comprising updating the trained neural network model based on data received from at least one other vehicle.

10. The method of claim 8, the method further comprising receiving the trained neural network model via an over-the-air (OTA) update.

11. The method of claim 8, the method further comprising determining another route via the updated trained neural network model.

12. The method of claim 8, the method further comprising causing the vehicle to traverse the route.

13. The method of claim 8, wherein the infrastructure device comprises a roadside device.

14. The method of claim 8, the method further comprising receiving a second trained neural network model from the specification platform, wherein the second trained neural model includes updated weights based on data stored within the data structure.

* * * * *